Inventor:
Norman Edward Kerridge
By Baldwin & Wight
Attorneys

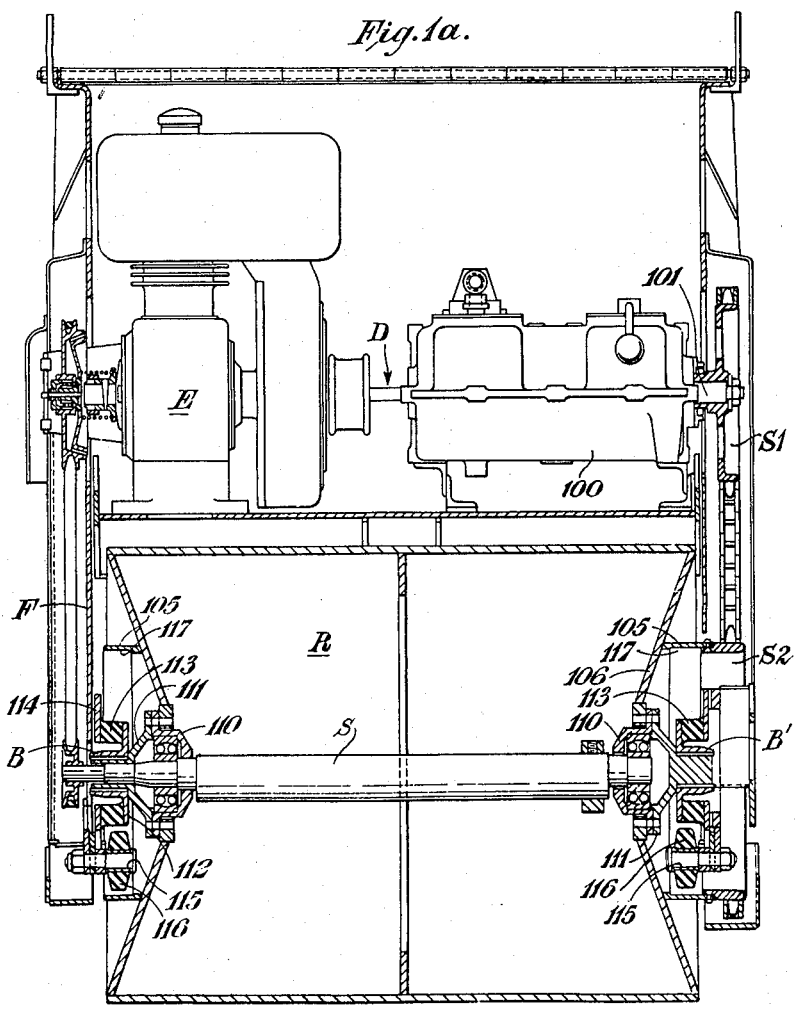

United States Patent Office 2,954,726
Patented Oct. 4, 1960

2,954,726

CHAIN TRANSMISSION DRIVE FOR VIBRATORY ROLLERS

Norman Edward Kerridge, Saltford, near Bristol, England, assignor to Stothert & Pitt, Limited, Bath, England, a British company Filed Oct. 3, 1955, Ser. No. 538,107

Claims priority, application Great Britain Oct. 20, 1954

2 Claims. (Cl. 94—50)

This invention comprises a chain transmission drive for vibratory rollers.

In a vibratory roller which is self-propelled by an engine on the roller frame it has been found possible to utilise the power unit to drive both the vibratory shaft by which the roll is caused to vibrate and also to drive the roll itself in order to propel the roller. It will be appreciated that in this type of roller due to the vibration, the distance between the axes of the roll and the power take-off from the engine or gear box, as the case may be, does not remain constant as in a normal type drive but relative displacement occurs by reason of the resilient mounting of the roll and the vibratory shaft, the purpose of which is to prevent vibration being transmitted to the roller frame to such an extent that it would be intolerable for the operator.

Numerous proposals have been made to tension a chain transmission making use of jockey pulleys, but known constructions of this kind have had disadvantages which are overcome by the present invention.

In order to use a chain drive to transmit the tractive effect to the driving roll of a vibrating roller, when the roll which provides the tractive effect is also the roll which vibrates, it is necessary to fulfill the following conditions:

(1) The chain must be capable of reversal in both senses—i.e. it must function with the sprocket attached to the engine or gearbox, revolving in a clockwisce or anticlockwise direction for forward or reverse travel, and it must function when the driving sprocket becomes the driven and the driven sprocket becomes the driver, as occurs during overrun.

(2) Since the sprocket attached to the vibrating roll will itself vibrate intensely and since also the relative positions of the drive centres vary due to the amplitude of vibration of the roll itself as well as due to the displacement of the roll caused by varying loads on the flexible mountings, it is necessary that the chain drive, whilst being suitable for constantly varying centres of the driver and driven sprocket, must have a chain with two tight sides, instead of the usual tight and slack sides— i.e. the return side as well as the driving side must be maintained at sufficient tension to (a) prevent the chain from vibrating in sympathy with the roll, and (b) prevent the chain from chattering against the teeth of the sprocket attached to the roll. Whilst fulfilling these conditions the chain must (c) automatically adjust itself to the varying sprocket centres, and (d) not transmit the vibration of the roll from the sprocket attached thereto to the driving sprocket and thus to the remainder of the machine.

The main object of this invention is to provide an improved chain and sprocket drive.

Another object of the invention is to provide a chain transmission drive which is capable of transmitting the required torque under all conditions of load while eliminating vibration in the chain itself.

In carrying out the invention the spring means for urging each jockey wheel preferably comprises a main spring means and an auxiliary spring means, the auxiliary spring means being arranged to come into operation when that length of the chain with which the associated jockey wheel is in contact is the driving length.

An important feature of the present invention is that there is always some slack taken up in each length of chain by the jockey wheels so that neither length, even when it is the driving length, is so straight and taut that it cannot "give" in response to relative vibratory motion between the driving and driven sprockets. If this were not so, that is to say, if the driving length of chain as a result of the tension therein, became straight and taut, then, since the chain is inextensible, the vibratory motion of the driven sprocket would be restricted and a sudden increase in the distance between the two sprockets would only be possible either by jerking the roll in the direction of travel or by momentarily slowing down the driving means.

In order to prevent the driving length of chain being pulled straight by the high tension therein the spring loading on the associated jockey wheel is preferably supplemented by an auxiliary spring means which is inoperative when that length of chain becomes the return length.

The invention is illustrated in the accompanying drawings in which Figure 1 is a vertical elevation of a chain transmission drive as applied to a vibrator self-propelled road roller.

Figure 1:
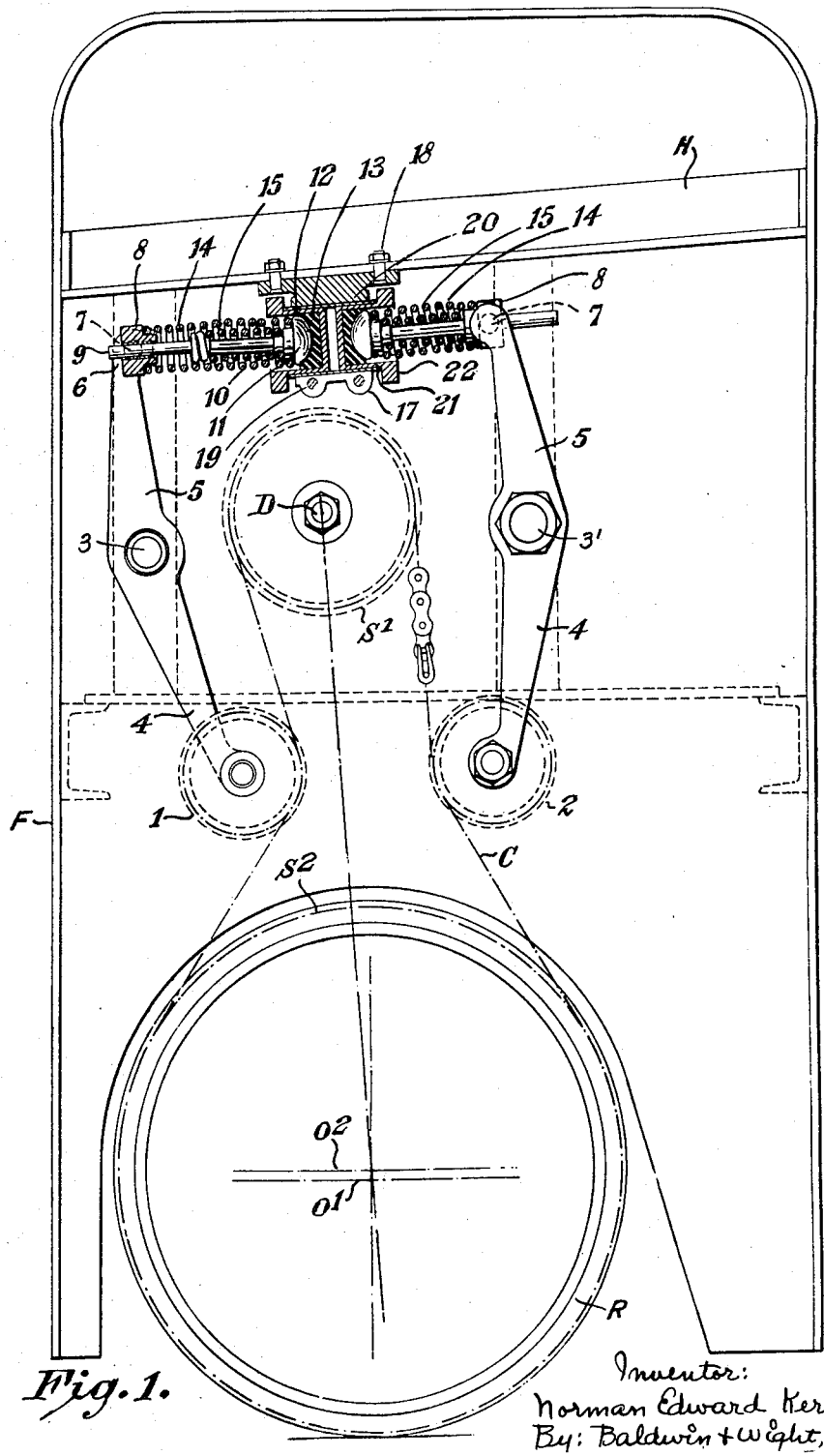
Figure 1A is a vertical sectional view of a road roller machine taken at right angles to the view shown in Figure 1.

In the drawings there is shown only such parts of the vibratory roller as is sufficient for the purpose of identification. The roller comprises a main frame indicated generally at F, a vibratory roll R, a main drive shaft D which may be driven direct from the power unit, e.g. as described and illustrated in Patent No. 2,671,386. H indicates a transverse member of the main frame F.

Figure 2:
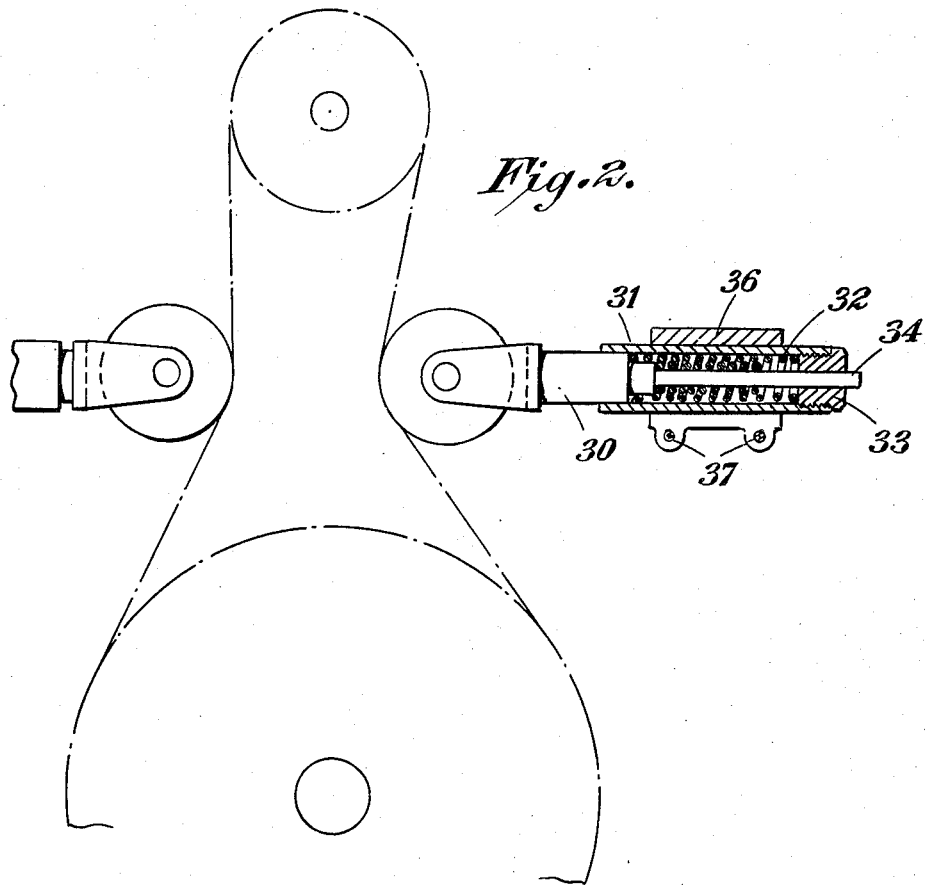
Figure 2 is a diagrammatical view of a roller having an alternative means of tensioning the jockey pulleys.

The suspension for the vibratory roll R may be by rubber blocks in shear, the rubber blocks being attached respectively to vertical faces provided by plates respectively on the main frame F and on spigot type bearings in which the roll R and vibratory shaft (not shown) are journalled to rotate, one form of mounting being illustrated in Figures 1 and 2 of Patent No. 2,671,386 where there is suspension by means of a single annular rubber block but we also contemplate the use of this invention in the case e.g. where a series of blocks are provided spaced apart to form an annulus. In addition the invention is applicable to a suspension making use of coil or other form of springing or coil and rubber or like resilient material as the cushioning means.

Referring now to Figure 1a it will be seen that the engine is utilised both to drive the shaft S and the roller body R so that the operator under normal working conditions is not called upon to exert a pull or push when using the roller, it being understood that the power unit can be used to drive the vibratory roller body and the vibratory shaft either separately or concurrently.

For this purpose the engine E is directly coupled to a gear box 100, which, as shown, is preferably fitted with reverse gear, the out-put shaft 101 of the gear box having keyed to it a driving sprocket S1, as will hereinafter be described; the driving sprocket S1 on the main drive shaft D is coupled by an extendible chain drive to a sprocket S2 fast with the roll R and conveniently to a flange 105 integral with one of the end discs 106 of the roller body R. As will hereinafter be explained, the chain drive transmission of this invention is required to extend and retract in order to permit all relative movement of the axles of the drive shaft D and the vibratory shaft S. The roller body R in the arrangement shown in Figure 1a is mounted to rotate about the out of balance shaft S on bearings in bearing housings 110 which bearing housings are fitted with trunnions 111 forming the stub axles of the roller body; these stub axles revolve in the flexibly mounted bushes B, B'.

Both the brushes B, B' and their counterparts on the roller frame have surfaces, to which the resilient block 113 is attached, arranged in parallel vertical planes. In the embodiment shown these surfaces are provided by flanges 112 on the bushes B, B' and annular discs 114 fast on the machine frame F, between which vertical flanges 112 and discs 114 resilient blocks 113 are attached in shear. The arrangement of the rubber in shear reduces the amount of vibration which is transmitted from the roller body to the machine frame.

Inwardly extending stub axles 115 are fixed to the frame F in position beneath the flexible mountings 113 and on these axles are carried rollers 116. These rollers are shod with rubber and function as snubbers co-operating with roller paths, which are conveniently provided by the interior faces 117 of the annular flanges 105 on the roller end discs. When the tractive effort required is high, the pull of the chain will cause the frame to descend relatively to the roller body R and the snubbers will prevent this movement from exceeding a predetermined amount. This enables more vibration insulation to be effected by permitting the flexible mountings to be much more flexible which is possible when using rubber in shear.

The chain drive transmission of this invention essentially comprises a driving sprocket $S^1$, on the main drive shaft D, a chain C for imparting drive to a second sprocket $S^2$ by which the roll R is directly or indirectly driven. Conveniently the sprocket $S^2$ is fast with the end plate of the roll R and may for this purpose take the form of a toothed ring.

In practice it has been found preferable to make use of a simple chain wherein the links are joined to one another by pins as distinct from a roller chain because it has been found that the rollers, due to the vibration of the roll tend constantly to rotate about their axes. As shown in Fig. 1, rotation of the chain C is in the anti-clockwise direction, but when the roller is reversed, the direction of drive of the sprocket $S^1$, becomes clockwise and therefore instead of the slack being on the left hand side as shown in Fig. 1 of the drawing, the left hand side of the free length of chain becomes the tight side and the right hand side becomes the slack side.

It will be appreciated that due to the vibration of the roll R, the axis of rotation of the roll has an up and down movement and this is represented in Fig. 1 of the drawing by the references $O^1$, $O^2$. Consequently as the lower chain wheel $S^2$ is vibrating, the chain C must be capable of stretching on both the slack and tight sides in order to permit this vibration. This is accomplished by means of the present invention by chain slack eliminators, as shown jockey pulleys 1 and 2 each consisting of a sprocket held in constant mesh with the free lengths of the chain and in engagement with the same sides thereof. Each jockey pulley is mounted on a lever arm, the two arms being independently controlled and urged in a direction to apply pressure to the chain by spring means. Conveniently we make use of two-armed levers capable of angular displacement about fixed centres 3, 3' on the machine frame F. The lower arm 4 of the two armed levers is provided with a suitable bearing for the jockey pulley and its other and upper arm 5 is bifurcated as at 6 to receive trunnions 7 integral with a shouldered spigot member 8.

Each spigot member 8 is drilled to receive a guide rod 9, the other end of which has secured to it a flange bearing head 10 having a spherical face 11, which in turn is accommodated in a spherical seating 12 in a cup 13 preferably of rubber.

Seated between the flange on the bearing head 10 and a shoulder on the spigot 8 is a main coil spring 14 termed the outer or main spring, the compression of which is sufficient to exert sufficient thrust through the lever arm 4—5 to maintain the associated sprocket against the free length of the chain.

A secondary and inner spring 15 is mounted on the rod 9 and operates primarily as a stop or buffer when the outer and main spring is compressed by reason of the tension set up in the tight side of the chain, which in Figure 1 of the drawing is the right hand side. It will be seen, therefore, that at the right side of the chain the vibration of the roll R i.e. the up and down movement of its axis becomes possible by stretching of the chain run which is permitted by further compression of both the inner and outer springs, whereas on the slack side, i.e. the left hand side, the stretching of the chain run under vibration of the roll is permitted by compression of the outer spring only. It will be understood that on reversal of the direction of the traction of the roller when the sprocket $S^1$ rotates clockwise, the relative positions of the two jockey pulleys will change over.

The two rubber cups are adjustably carried by means of a split bracket 17 fastened by bolts 18 to the cross bar H of the roller frame, the two portions of the bracket being secured to one another by screws 19. By loosening the screws 19, the pressure exerted on the cups 13 by the split bracket 17 may be relaxed, and the cups adjustably positioned in the bracket, the screws 19 then being tightened to draw the bracket parts together and thus hold the cups in adjusted positions. In the bracket 17 is a tubular housing 20 which is secured to receive sleeve elements 21 having flanged ends 22 in which the rubber cup members 13 are housed.

In practice, it has been found desirable to reduce the size and weight of the two armed levers 5 to a minimum and to use "noise reducing" type jockey pulleys which has the effect both of reducing noise and improving the action of the pulleys.

Referring now to Figure 2, the jockey pulleys are each carried by plungers 30 slidably mounted in guided sleeves 31 being free to slide therein against the force exerted by a main coil spring 32 which is of sufficient tension to overcome any slack in the free length of the chain. In order to adjust the force exerted by the spring 32 the sleeve is fitted at one end with a screwed collar 33, the interior of the collar providing a guide for a spigot piece 34, forming part of the plunger 30. Split tubular housings 36 are provided for the sleeves 31 so that by releasing the clamping screws 37 the position of the sleeve may be adjusted.

Figure 3:
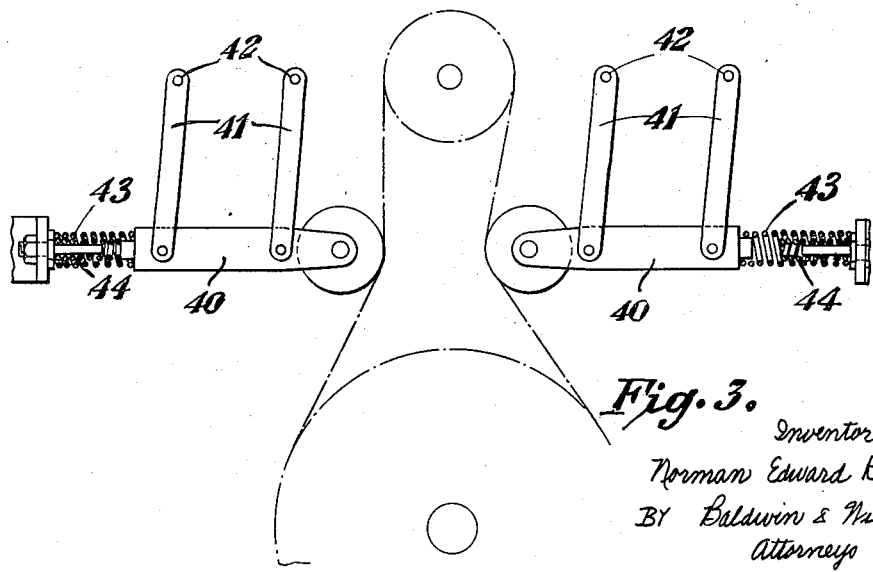
Figure 3 is a detailed view showing another form of tensioning means for the jockey pulleys.

Referring now to Figure 3, in place of the slidable plungers 30 the jockey pulleys are carried by swing arms 40 suspended by parallel links 41 from fixed points 42 on the roller frame. Main coil springs 43 are provided to urge the jockey pulleys in a direction to take up a slack in the chain. In addition a secondary and interior spring 44 may be fitted as a stop spring to operate in a manner similar to that described in Figure 1.

It will be found that this invention provides a chain transmission gearing for power transmission from a driving sprocket to a driven sprocket which fulfills the following conditions:

(1) The drive being elastically extensible will virtually eliminate the transmission of vibration from the driven sprocket to the driving sprocket or from the driving sprocket to the driven sprocket (e.g. the latter condition applies during over-run) for driving in either direction.

(2) Both the tight strand and the slack strand of the chain will, when driving in either direction and with either sprocket being the driver, be subjected to tension which prevents either of the chain strands vibrating in sympathy with the vibration of the roll, and also the chain from chattering on the sprockets. Thus both tight and slack strands of the chain will always be subject to tension, as in a belt drive, but such that the tight side is subject to a greater tension than the slack side.

(3) Automatic compensation for any variation in the distance separating the axes of the driven and driving sprockets, while being capable of reversal both in the sense of the direction of the drive (e.g. from clock-wise to anti-clockwise), and in the sense of the driven sprocket becoming the driver (e.g. during over-run) with any combinations of these two types of reversal.

(4) The drive will act as a cushion for sudden starts of reversals. It becomes possible to reverse the direction of drive of the machine whether using high or low speed drive simply by use of the reversing lever.

This is a particular advantage in a tandem roller since by providing two reversing levers, one accessible to the left hand and the other to the right hand of the driver's seat, it is possible for him to steer to a line e.g. a curb stone on either side.

When changing from forward to reverse or vice versa it will be found that there is no sudden reversal and that the change over is carried out smoothly without any jerk. This is evident from the action of the chain which performs its reversal without difficulty or jump and which is not possible with a pulley type drive.

What is claimed is:

1. In a vibratory roller construction of the class wherein a roller is mounted rotatably on a frame and is subjected to vibration in addition to being rotated, the combination of a frame; an eccentric shaft mounting said roller for rotation; bearings in which said shaft is rotatably and eccentrically mounted; cushioning means mounting said bearings on said frame for enabling vibration of said shaft and said roller; a power operated driving sprocket mounted on said frame; a driven sprocket operatively connected to said shaft; a driving chain operatively connecting said driving sprocket to said driven sprocket and having two opposite runs extending between said sprockets; two rotary chain slack eliminators; supports separately mounted on said frame for movements relative to said frame and relative to each other and respectively mounting said chain slack eliminators for rotation and in contact respectively with said opposite chain runs and for independent movements relatively toward and away from the respectively contacted chain runs; and spring devices respectively separately urging said supports to press said slack eliminators against the associated chain runs, said spring devices comprising a common spring anchorage including a housing and two cup elements adjustably carried therein, guide rods respectively having spherical heads supported for universal movement in the associated cup elements, means respectively slidably mounted on said guide rods and connected to said supports, a main spring on one of said guide rods and interposed between one of said cup elements and one of said slidably mounted means for constantly urging the associated support to press the associated slack eliminator against the associated chain run, and a secondary spring on the other of said guide rods and interposed between the other of said cup elements and the other of said slidably mounted means and operable only after said main spring has been stressed to a predetermined extent by tensioning of said chain, whereupon both said main and secondary springs will yieldably oppose movement of said supports and said slack eliminators by further tensioning of said chain.

2. A construction according to claim 1 in which said means respectively mounted on said guide rods comprise spigots respectively formed with seatings for said main and secondary springs.

References Cited in the file of this patent
UNITED STATES PATENTS

| | | |
|---|---|---|
| 1,815,954 | Opie | July 28, 1931 |
| 1,871,268 | Hildebrand | Aug. 9, 1932 |
| 2,110,439 | Gordon | Mar. 8, 1938 |
| 2,563,370 | Reese | Aug. 7, 1951 |
| 2,590,050 | Smith | Mar. 18, 1952 |
| 2,639,623 | Ausherman | May 26, 1953 |
| 2,663,195 | Horan | Dec. 22, 1953 |
| 2,671,386 | Kerridge | Mar. 9, 1954 |
| 2,677,995 | Wood | May 11, 1954 |
| 2,701,616 | Cooper | Feb. 8, 1955 |

FOREIGN PATENTS

| | | |
|---|---|---|
| 832,527 | Germany | Feb. 25, 1952 |